United States Patent
Schleicher et al.

(10) Patent No.: US 12,026,940 B2
(45) Date of Patent: Jul. 2, 2024

(54) IMPLEMENT MANAGEMENT SYSTEM FOR DETERMINING IMPLEMENT STATE

(71) Applicant: Deere & Company, Moline, IL (US)

(72) Inventors: Tyler D. Schleicher, Ankeny, IA (US); Curtis A. Maeder, Johnston, IA (US); Noel W. Anderson, Fargo, ND (US); Jeffrey E. Runde, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 486 days.

(21) Appl. No.: 17/349,688

(22) Filed: Jun. 16, 2021

(65) Prior Publication Data

US 2022/0405498 A1 Dec. 22, 2022

(51) Int. Cl.
*A01B 79/00* (2006.01)
*G05D 1/00* (2006.01)
*G06F 18/214* (2023.01)
*G06N 20/00* (2019.01)
*G06V 20/13* (2022.01)

(52) U.S. Cl.
CPC ............ *G06V 20/13* (2022.01); *A01B 79/005* (2013.01); *G05D 1/0094* (2013.01); *G06F 18/214* (2023.01); *G06N 20/00* (2019.01)

(58) Field of Classification Search
None
See application file for complete search history.

(56) References Cited

U.S. PATENT DOCUMENTS

| 10,686,976 | B2 | 6/2020 | Nalepka et al. |
| 2019/0320580 | A1* | 10/2019 | Haneda ................ A01D 34/008 |
| 2020/0113118 | A1* | 4/2020 | Stanhope ............. A01B 69/007 |
| 2022/0406104 | A1* | 12/2022 | Maeder ................ G05D 1/0094 |

OTHER PUBLICATIONS

Extended European Search Report and Written Opinion issued in European Patent Application No. 22175230.6, dated Nov. 17, 2022, in 07 pages.

* cited by examiner

*Primary Examiner* — Dov Popovici
(74) *Attorney, Agent, or Firm* — Fenwick & West LLP

(57) ABSTRACT

An implement management system detects implement wear and monitors implement states to modify operating modes of a vehicle. The system can determine implement wear using the pull of the implement on the vehicle, the force and angle of which is represented by an orientation vector. The system may measure a current orientation vector and determine an expected orientation vector using sensors and a model (e.g., a machine learned model). Additionally, the implement management system can determine an implement state based on images of the soil and the implement captured by a camera onboard the vehicle during operation. The system may apply different models to the images to determine a likely state of the implement. The difference between the expected and current orientation vectors or the determined implement state may be used to determine whether and how the vehicle's operating mode should be modified.

19 Claims, 6 Drawing Sheets

IMPLEMENT MANAGEMENT SYSTEM FOR DETERMINING IMPLEMENT STATE

This disclosure relates generally to a detection system for vehicles, and more specifically to detecting conditions of implements pulled by a farming vehicle to modify the operation (e.g., automated navigation) of the farming vehicle.

BACKGROUND

Operators of a farming vehicle conventionally monitor the implements such as plows or sprayers pulled by farming vehicle by periodically checking the implement by looking at the implement from the cabin of the farming vehicle. An implement naturally wears over time as operations are performed, and operators conventionally monitor the implement for wear during operation. An implement may be worn out to a point where a component of the implement falls from the implement while the vehicle operates. In addition to monitoring the wear of the implement, the operator of a conventionally operated farming vehicle may monitor the state of the implement. Some implements are not designed to be in a certain state in combination with operating the farming vehicle in a particular way. For example, a tractor operator may check if the shanks of a plow are raised before putting the tractor in reverse. The shanks can be attached to the plow such that their rotational motion is limited to a fixed range. If the shanks are not raised when the vehicle travels in reverse, they may break or dislodge from the vehicle.

Automated farming operations allow the operator to be located away from the farming vehicle. The operator may perform other tasks in parallel to the automated farming operations and thus, may be unavailable to monitor the implement's conditions during the automated operations. However, insufficient monitoring may lead to the implement breaking or a component of the implement falling off without the operator noticing. Another farming vehicle may be damaged while navigating over the fallen implement. Furthermore, an implement with a broken or fallen implement may not properly perform a desired operation.

SUMMARY

An implement management system for detecting implement wear and monitoring implement states to modify operating modes of a vehicle is described herein. The system controls the operating mode of a farming vehicle based on detected implement wear or determined implement states. The system can determine implement wear based on the pull of the implement on the vehicle, the force and angle of which are represented by an orientation vector. The system may measure a current orientation vector and determine an expected orientation vector using sensors such as force sensors, angle sensors, and cameras onboard the vehicle or the implement. The system may apply a model (e.g., a machine learned model) to the operational information measured by the sensors to determine the expected orientation vector. The difference between the expected and current orientation vectors may be used to determine whether and how the vehicle's operating mode should be modified. By modifying the operating mode before the wear of an implement causes a component to break or fall off, the system prevents damage to other farming vehicles and allows the vehicle to properly finish the desired operation.

Additionally, the implement management system can determine an implement state based on images captured by a camera onboard the vehicle during operation. The images may depict the soil, the implement, or a combination thereof. The system may apply different models to the images to determine a likely state of the implement. For example, the system may apply a machine learning model to determine a moisture level of the soil and apply another machine learning model to determine whether a shank of a plow operating in the determined soil moisture level is raised. If the system determines that the shank is ground-engaged before the vehicle reverses, the system may modify the operating mode of the vehicle by raising the shank. The determined implement state may be used to determine whether and how the vehicle's operating mode should be modified. Thus, the system prevents damage to the shank and helps ensure that the vehicle continues to operate with the functional shank.

In one embodiment, the implement management system receives operational information for determining an expected orientation vector of an implement pulled by a vehicle. The operational information can include a predefined routine of the vehicle pulling the implement, vehicle worksite parameters, machinery state parameters, machinery trajectory parameters, or a combination thereof. A current orientation vector of the implement is determined using one or more sensors coupled to the vehicle, where the current orientation vector is indicative of a current angle of pull of the implement on the vehicle. An orientation prediction model may be applied to the operational information to determine an expected orientation vector of the implement indicative of an expected angle of pull of the implement on the vehicle. In response to a difference between the current and expected orientation vectors exceeding a threshold angle, the system modifies an operating mode of the vehicle.

To determine the current orientation vector, the system can determine a towing angle of the implement using an angle sensor, determine an offset exists between a heading value of the vehicle and a heading value of the implement using a rear-facing camera, or compare a global positioning system (GPS) receiver heading value of the vehicle with a GPS receiver heading value of the implement. The orientation prediction model can be a rules-based model or a mathematical formula. The orientation prediction model can also be a machine learning model trained on sets of empirical operational information associated with respective empirical orientation vectors. The machine learning model may be configured to identify the expected orientation vector from the empirical orientation vectors based on the received operational information.

The system can train the machine learning model by creating a training set comprising the sets of empirical operational information, each set of empirical operation information associated with an empirical orientation vector of a functioning implement or a malfunctioning implement. The system uses this training set to train the machine learning model. The system may also re-train the machine learning model. An indication of user feedback may be received within a threshold time after the operating mode is modified. The indication can include a manual override to the modified operating mode or a non-response to the modified operating mode. In response to the indication including the manual override, the system can re-train the machine learning model by, for example, weakening an association between the expected orientation vector and the received operational information. In response to the indication including the non-response, the system can re-train the machine learning model by strengthening the association between the expected orientation vector and the received operational information. The empirical orientation vector associated with the training sets may be of functioning implements, malfunctioning implements, functioning wheels of the implement, or malfunctioning wheels of the implement. The implements can include a shank, sweep, or combination thereof.

The orientation prediction model can be a statistical model configured to output an expected orientation vector based on historical operational information and corresponding empirical orientation vector. The vehicle worksite parameters may include one or more of a topography, a soil type, a soil moisture measurement, or a soil compaction measurement of an environment in which the vehicle operates. The machinery state parameters can include one or more of a dimension of the vehicle, a dimension of the implement, a number of ground engaging elements of the implement, a speed of the implement, an acceleration of the implement, a type of a ground engaging element of the implement, or a depth of the ground engaging element. The machinery trajectory parameters can include one or more of an elevation of a wheel of the vehicle, an elevation of a ground engaging element of the implement, towing angle of the implement, or a steering angle of the vehicle. The vehicle may be an automated farming vehicle configured to operate according to the predefined routine.

The implement management system may modify the operating mode of the vehicle by determining whether a ground engaging element of the implement is missing and in response to determining the ground engaging element of the implement is missing, pausing operation of the vehicle. The system may determine whether the ground engaging element of the implement is missing by comparing the current angle of pull of the implement on the vehicle to an expected angle of pull of the implement with a missing ground engaging element. In some embodiments, a modification for modifying the operating mode of the vehicle is determined at a remote server and transmitted from the remote server to the vehicle.

In another embodiment, the implement management system may access information representative of a state of soil and images captured by a vehicle of an implement pulled by the vehicle to determine a state of the implement. The system accesses information representative of the state of soil obtained via sensors of the vehicle pulling the implement through the soil. An implement state model is selected from implement state models based on the accessed information, where each of the plurality of implement state models configured to determine a state of the implement based on images of the implement. A set of images captured by the vehicle is accessed, where the set of images includes images of the implement. The system applies the selected implement state model to the set of images to determine the state of the implement. The system modifies an operating mode of the vehicle based on the determined state of the implement.

The implement may include one or more of a shank, sweep, disk, blade, wheel, tine, knife, or any suitable component that engages with the ground during a farming operation. The state of the soil may include a soil type, a soil moisture measurement (e.g., a plasticity level of the soil), or a soil compaction measurement. The state of the implement may be raised or ground-engaged. The implement management system may access implement state information obtained via height sensors of the vehicle, determine a height of the implement based on the accessed implement state information, and determine the state of the implement based on the determined height and the output of the selected implement state model. The height sensors can include one or more of potentiometers, altimeter, angle sensors, GPS, radar, or sonar. Determining the height of the implement may include determining an expected elevation based on GPS and a predefined route of vehicle, determining an empirical elevation of the implement using an altimeter, and calculating a difference between the expected elevation and the empirical elevation to determine height.

The implement management system may determine the state of the implement using a collective decision based on the applied implement state model and one or more of hydraulic information, hitch information, sensor information, or perception information. The collective decision may be vote-based, where the determined state of the implement is the state that receives the most votes. The system can determine a location of the vehicle within a predefined route of the vehicle and in response to the determined location matching a predetermined location for checking the implement state, determine the state of the implement. To modify the operating mode of the vehicle, the system may, in response to a next vehicle maneuver requiring the state of the implement to be raised and the determined state of the implement is ground-engaged, pause operation of the vehicle. The system may modify the operating mode by authorizing the vehicle to perform a next vehicle maneuver in response to the next vehicle maneuver requiring the state of the implement to be raised and the determined state of the implement is raised. The next vehicle maneuver may be a full tight turn.

In some embodiments, modifying the operating mode includes instructing the vehicle to engage the implement with the soil in response to the operating mode requiring the state of the implement to be ground-engaged and the determined state of the implement is raised. The accessed information may include images of the soil and the system, to select the implement state model, applies a machine learning model to the images of the soil to determine a plasticity level of the soil based on images of the soil and selects the implement state model based on the determined plasticity level of the soil. The implement management system may train the machine learning model on training images of soil, each training image labeled with an empirical plasticity level of the depicted soil. The sensor information can include a torque measurement of the vehicle, where torque measurements correspond to various states of soil.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
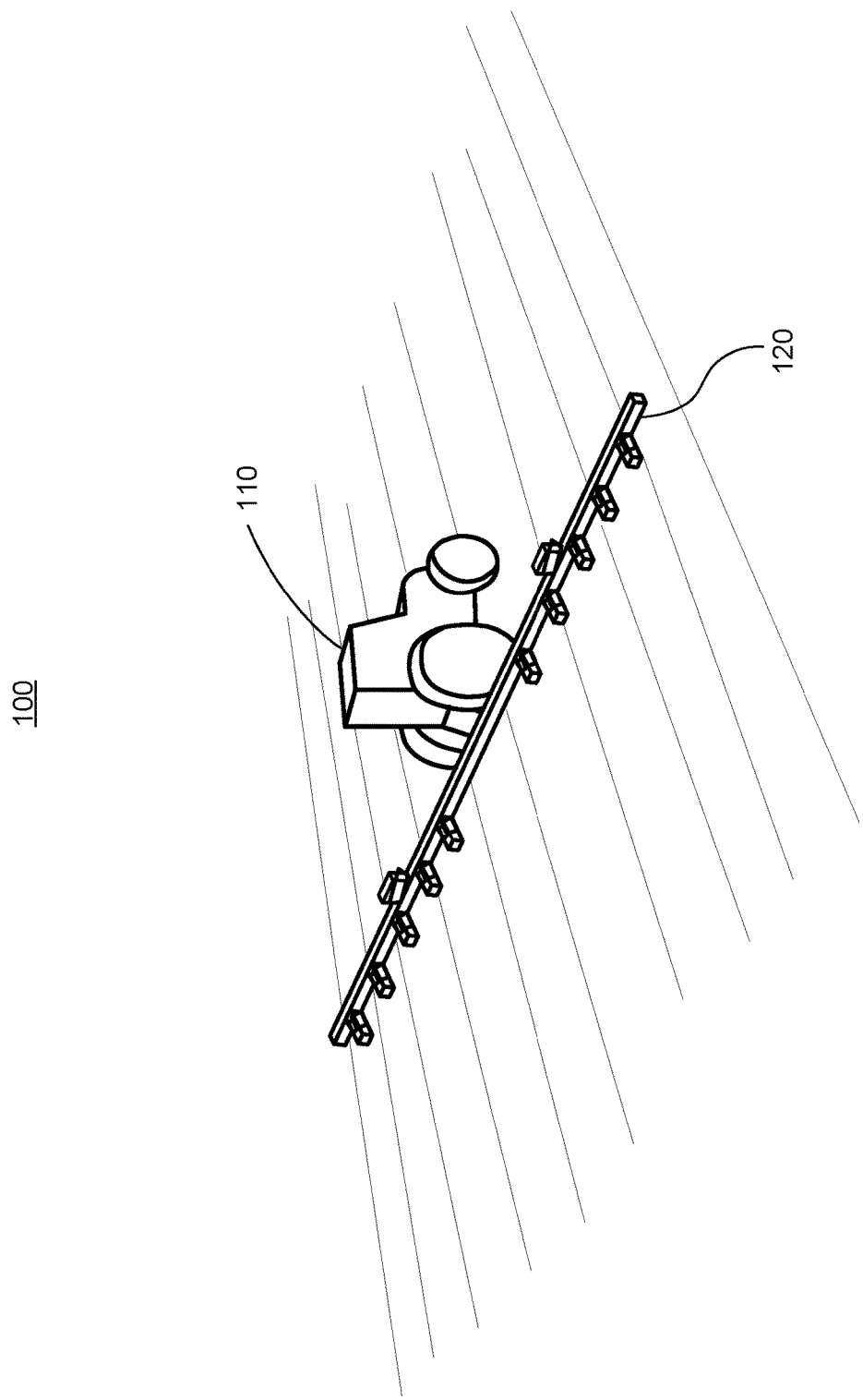
FIG. 1 is a block diagram of an environment in which a vehicle operates, in accordance with at least one embodiment.

FIG. 1 is a block diagram of an environment 100 in which a vehicle 110 operates, in accordance with at least one embodiment. As depicted, the vehicle 110 is a tractor coupled to an implement 120, a plow. Examples of implements may include shanks or sweeps, which are also components of plows. The vehicle 110 may perform a routine (e.g., either autonomously or semi-autonomous) using the implement 120. For example, the tractor may loosen soil using the plow along a route that is predefined by the operator of the vehicle 110. The vehicle 110 may use an implement management system to monitor the implement 120 as it is used to perform routines. The implement management system detects wear in the implement 120 or determines the state (e.g., position) of the implement to prevent damage to the implement 120 and allow the vehicle 110 to properly perform the routine. The implement management system to monitor and manage implements to perform operations is further described in FIG. 2.

The environment 100 may be characterized by parameters, which are referred to herein as "vehicle worksite parameters." Vehicle worksite parameters may include topography, soil type, soil moisture, compaction, or any other suitable property of the medium in which the implement is pulled through by the vehicle. Topography may include landforms (e.g., rivers, hills, roads, etc.) or the elevation of the surface that the vehicle 110 is traveling (i.e., relative to sea level). Soil type may include the composition of the soil. For example, the vehicle 110 may be pulling the implement 120 through sand, silt, clay, loam, crops, or a combination thereof. Soil moisture may represent the liquid (e.g., water) content within a given volume of soil. Soil moisture may be measured using probes or sensors that output volumetric soil water content, soil relative water content, dielectric permittivity, or any suitable measure of liquid content within a given volume of soil. Plasticity index, also referred to herein as "plasticity level," may be used to indicate soil moisture levels at which soil exhibits plastic material properties. Soil compaction may be measured using penetration resistance associated with, for example, units of pressure (e.g., psi) measured by a soil probe at a given depth of the soil. Vehicle worksite parameters may also include weather conditions. For example, the implement management system may account for the current weather or additionally, weather dating back a user-specified period of time (e.g., one week).

In some embodiments, vehicle worksite parameters may vary across a dimension (e.g., a width) of the implement 120. For example, the soil moisture may have a higher concentration of water at one end of a plow than at another end of the plow. The implement management system may determine this difference in vehicle worksite parameters across a dimension of the implement 120 and use the determined difference to detect wear or determine a state of the implement across the dimension of the implement 120. For example, the implement management system may determine one end of the plow is being pulled through mud and use a model associated with the corresponding soil condition to determine if that end of the plow is likely to be worn out. In this example, another end of the plow may be pulled through dry soil and the implement management system may determine this soil condition and select a model associated with the corresponding soil condition to determine wear with respect to that end of the plow.

The vehicle 110 may be coupled to an implement 120. Examples of implements include a plow having ground engaging elements such as a sweep or shank, sprayers, trailers, balers, or any suitable machinery for performing farming operations. Other examples of ground engaging elements include disks, blades, wheels, tines, and knives. In one example, the vehicle 110 is a tractor that is coupled to a plow at the hitch of the tractor, the tractor pulling the plow along through a field. In another example, the vehicle 110 is a tractor coupled to a sprayer at the hitch, the tractor pulling the sprayer to distribute insecticide along a predefined route. Implements may have various positions during operation such as raised or ground-engaged. For example, one or more shanks of a plow may be raised as the vehicle 110 is traveling to avoid plowing a particular area of a field or to avoid damaging the shanks if the vehicle 110 is moving backward.

In some embodiments, the vehicle 110 operates autonomously or semi-autonomously, following a predefined routine. The predefined routine may include a route that the vehicle 110 travels, operations that the vehicle 110 performs throughout or at specified locations along the route. An operating mode can characterize the operations performed by the vehicle 110. Examples of operating modes include pausing operations, engaging in an operation (e.g., plowing), moving in a direction (e.g., reverse), or a combination thereof. In some embodiments, an operating mode is a manual override, where an operator may pause automated operations and manually control the operations of the vehicle 110 or the implement 120. An operator may be co-located with the vehicle 110 or remotely located (e.g., at an office). Remotely located operators can interact with the implement management system described herein to control the operations of the vehicle 110 or the implement 120. The implement management system may be located at the vehicle 110 (e.g., on an embedded controller), a remote server away from both the operator and the vehicle 110, or at a computing device co-located with an operator but remote from the vehicle 110.

Machinery state parameters and machinery trajectory parameters characterize the conditions of the vehicle 110 or the implement 120. The term "machinery" refers to a combination of a vehicle and an implement. Machinery state parameters includes one or more of a dimension of the vehicle 110, a dimension of the implement 120, a weight of the vehicle 110, a weight of the implement 120, a number of ground engaging elements of the implement 120, a speed of the implement 120, an acceleration of the implement 120, a type of a ground engaging element of the implement 120, or a depth of the ground engaging element 120. Dimensions may include measurements of the space with which a vehicle or implement occupies such as a length, width, or height. In one example, the vehicle 110 has dimensions of 4.75 meters in length, 2.4 meters in width, and 3 meters in height. The weight of the vehicle 110 may be 5600 kilograms. In another example, the implement 120 may have dimensions of 4 meters in width. These dimensions can be used to determine an expected force or angle of pull by the implement 120 on the vehicle 110. The force and angle of pull by an implement on a vehicle is referred to herein as "an orientation vector."

The machinery state parameters and machinery trajectory parameters may be used individually or in combination to determine an expected orientation vector. More generally, operational information including machinery state parameters, machinery trajectory parameters, vehicle worksite parameters, or a predefined routine of the vehicle 110 pulling the implement 120 may be used to determine the expected orientation vector. A number of ground engaging elements of the implement 120 may be a number of shanks or sweeps being pulled by the vehicle 110. Shanks and sweeps are example types of ground engaging elements. Machinery trajectory parameters includes one or more of an elevation of a wheel of the vehicle, an elevation of a ground engaging element of the implement, a towing angle of the implement, or a steering angle of the vehicle. Machinery trajectory parameters may be defined with reference to a global coordinate system such as World Geodetic System (WGS 84). Machinery trajectory parameters may be defined with reference to a local coordinate system such as a height above ground level.

The vehicle 110 includes sensors to measure information about the operating conditions of the vehicle 110. This operational information can include a vehicle worksite parameter, machinery state parameter, machinery trajectory parameter, a statistical or historical model of machinery behavior, or a combination thereof. The vehicle 110 can include a local computing device having a display and embedded controller, which enables local execution of the implement management system for detecting implement states and managing vehicle operations. An operator co-located with the vehicle 110 may use the display provide user input to the implement management system. For example, the display is a touch screen that receives instructions for manual override of a change in operating mode determined by the implement management system. Hardware components of the vehicle 110 are further described in the description of FIG. 2.

While the vehicle 110 is referred to herein as a farming vehicle (e.g., a tractor), the vehicle 110 may be any autonomous, non-autonomous, or semi-autonomous vehicle configured to pull an object (e.g., an implement) and monitor the pull of the object. For example, a vehicle may monitor the pull of an object based on relative orientation of the object to the vehicle or the position of the object relative to the surface at which the vehicle is operating. In some examples, the vehicle 110 may include a blade or bucket used to remove or distribute soil at a construction worksite. The techniques described herein as performed by an implement management system are not limited to farming and may be used in other applications such as construction, recreation, transportation (e.g., cargo or passenger), or any suitable application where a vehicle pulls an object. Furthermore, although a land-based vehicle is referred to herein, the operations of the implement management system may be applicable to aircrafts (e.g., a drone) or watercrafts configured to pull objects.

While a vehicle pulling an implement is referenced throughout the specification, the implement management system described herein may similarly apply to a vehicle pushing an implement. The implement management system may detect wear and implement states of implements moved (e.g., pushed or pulled) by a vehicle. For example, sensors may measure a force with which or angle at which a vehicle pushes an implement, the measurement taken at a location where the implement is coupled to the vehicle. Cameras may be forward-facing to capture the implement that the vehicle is pushing and environment around the implement. Images or videos captured by the cameras may be used by the implement management system to determine an expected orientation vector or implement state.

In one example use case of the implement management system, the system monitors for the wear of the implement 120 pulled behind the vehicle 110. As the implement 120 is pulled, the implement 120 wears and the likelihood that components of the implement 120 will break or fall off increases. Broken or missing implements can negatively impact the performance of farming operations and affect the operation of other farming vehicles that may be damaged while traveling over fallen implements. The implement management system helps operators detect and estimate wear in the implement 120 before the implement breaks or falls off.

In another example use case of the implement management system, the system monitors for the status, or position, or the implement 120 during farming operations. Some implements are designed to function in a particular state and direction of movement and may be damaged if used otherwise. For example, shanks of a plow are designed to ground-engaged while pulled by a vehicle traveling forward and may break if the vehicle travels in reverse with the shanks still engaged in the ground. The implement management system may determine the state of the shanks as either raised or ground-engaged, and ensure that the state is compatible with a mode of operation (e.g., raised is compatible with the vehicle's movement in reverse).

System Architecture

Figure 2:
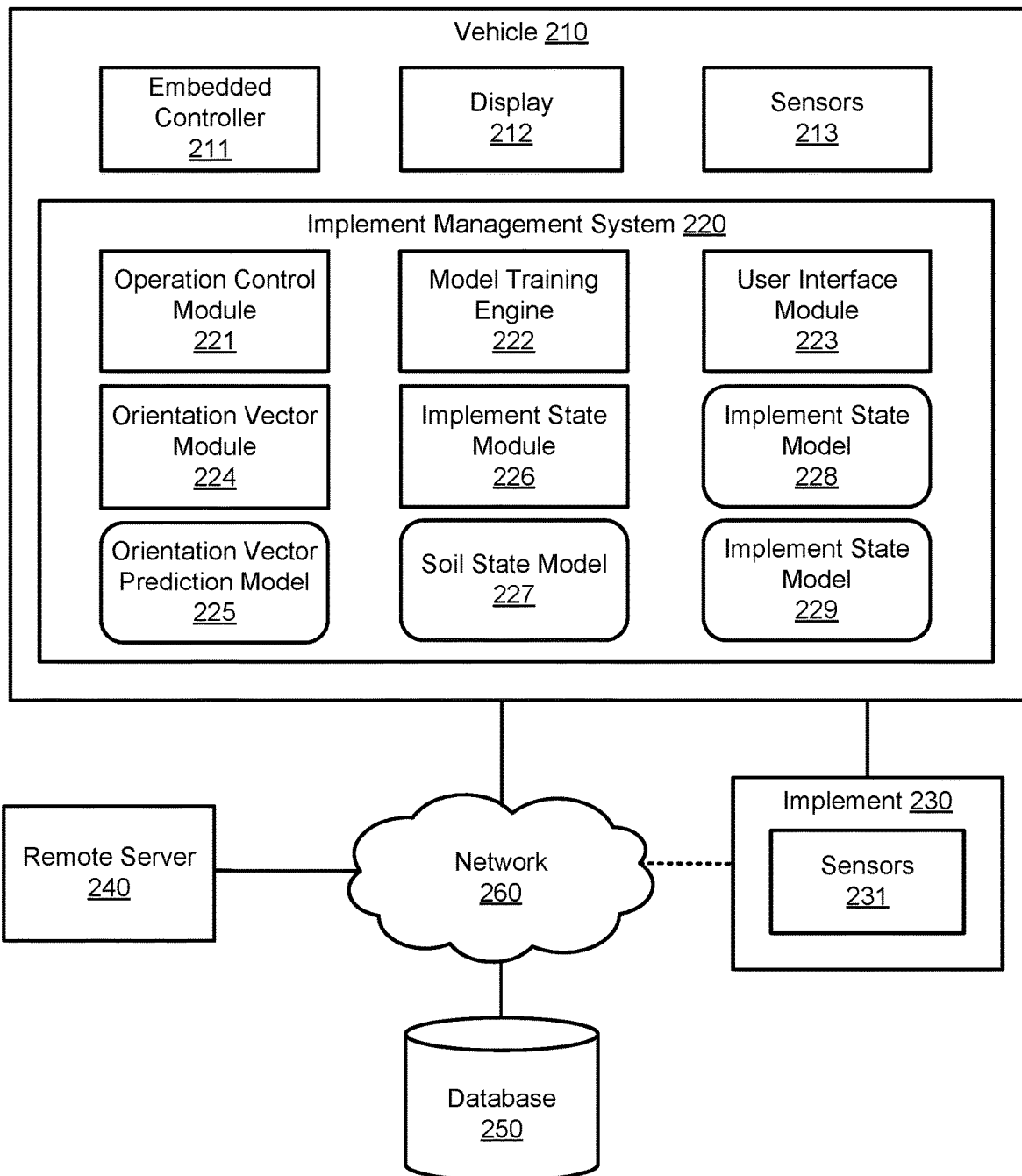
FIG. 2 is a block diagram of a system environment in which a vehicle operates, in accordance with at least one embodiment.

FIG. 2 is a block diagram of a system environment 200 in which a vehicle 210 operates, in accordance with at least one embodiment. The system environment 200 includes a vehicle 210, an implement 230, a remote server 240, a database 250, and a network 260. The system environment 200 may have alternative configurations than shown in FIG. 2, including for example different, fewer, or additional components. For example, the vehicle 210 may operate offline and thus, the system environment 100 may not include the network 260 or the remote server 240 and the contents of the database 250 may be stored locally within memory located at the vehicle 210.

The vehicle 210 includes hardware and software modules configured to enable the vehicle 110 to perform tasks autonomously, non-autonomously, or semi-autonomously. The vehicle 210 includes hardware such as an embedded controller 211, a display 212, and sensors 213. The vehicle 210 includes software such as an implement management system 220. The vehicle 110 may have alternative configurations than shown in FIG. 1, including for example different, fewer, or additional components. For example, the vehicle 110 may include a computing device such as a tablet or smartphone including the display 212 and configured to execute the implement management system 220 software. Although not depicted, the vehicle 210 may include radio frequency (RF) hardware to enable the vehicle 210 to communicatively couple to the network 260. The RF hardware may be included within a computing device. Although the embedded controller 211, the display 212, and the sensors 213 are shown as components separate from the implement management system 220, one or more of these components may be included within the implement management system 220.

The embedded controller 211 enables communication between a computing device executing the implement management system 220 and vehicle navigation controllers (e.g., a steering motor controller). The embedded controller 211 may enable this communication using a Controller Area Network (CAN) bus, optical transceivers (connected from display) or digital pulse width modulation (PWM) electrical signals. The embedded controller 211 may receive data generated by the implement management system 220 and generate corresponding instructions for the vehicle navigation controllers. The embedded controller 211 may include a central processing unit (CPU), memory, and input/output (I/O) for communicating data between sensors 213, the display 212, or a computing device executing the implement management system 220. In some embodiments, the embedded controller 211 may include memory and one or more processors that stores and executes, respectively, the implement management system 220.

The display 212 provides an output for a graphical user interface (GUI) for the implement management system 220 to be displayed and an input for the operator or supervisor of the vehicle 210 to control the implement management system 220. A user interface of the vehicle 210 may be a keypad, keyboard, touch screen, touchpad, stylus input, voice recognition interface, any suitable interface for receiving user input, or a combination thereof. The display 212 may be provided as a stand-alone device or integrated with other elements of the vehicle 210. The display 212 may be a display of a mobile device (e.g., a tablet).

The sensors 213 capture operational information while the vehicle 210 is pulling the implement 230 to perform a farming operation. Operational information may include vehicle worksite parameters such as soil type and topography, machinery state parameters such as the dimensions of the vehicle and the implement 230, or machinery trajectory parameters such as the acceleration of the implement 230 pulled by the vehicle 210. Additional examples of operational information are described in the description of FIG. 1. The sensors 213 can measure information to determine a current orientation vector of the implement 230 coupled to the vehicle 210. For example, GPS receivers, electronic compasses, inertial sensors, angle sensors, force sensors, or cameras may be included in the sensors 213 for orientation vector determination. The sensors 213 can measure information to determine states (e.g., a position) of the implement 230 coupled to the vehicle 210. The sensors 213 can include GPS receivers, altimeters, angle sensors, potentiometers, radar, sonar, or cameras for determining implement state. These sensors for determining whether the state of the implement 230 is raised or ground-engaged may be referred to herein as "height sensors." In some embodiments, the sensors 231 are installed at the implement 230 and may be communicatively coupled to the implement management system 220 (e.g., wired to the vehicle 210 or via a wireless connection over the network 260). For example, the sensors 231 to determine an elevation of the implement 230, and the elevation is transmitted to the implement management system 220 to determine the state of the implement at the implement state module 226.

The sensors 213 may include a camera that captures images and/or video for the implement management system to determine the state of the implement 230. Images captured by the camera may be used for capturing images of the environment in which the vehicle 210 operates (e.g., images of the soil) and the machinery (e.g., images of the implement 230). The implement management system 220 can modify operating modes of the vehicle 210 based on states of the implement 230 (e.g., raised or ground-engaged) determined using the captured images. In some embodiments, a camera may be used to detect whether the implement 230 is following straight behind the vehicle 210, which enables the implement management system 220 to determine that the heading of the implement 230 is not the same as the heading of the vehicle 210. The camera may be an RGB camera, 3D stereo camera, mono camera, video camera, thermal camera, light detection and ranging (LiDAR) camera, any other suitable camera for capturing images used to determine soil conditions or an implement position, or a combination thereof. The camera may be a standalone camera, integrated within the vehicle 210, or integrated within a computing device executing the implement management system 220. The camera is communicatively coupled to the implement management system 220 to access images captured. The camera may be in a front-facing configuration such that the images capture surfaces ahead of the vehicle. While reference is made to captured images for clarity throughout the specification, the operations described with respect to images may be likewise applicable to videos captured by the camera.

The implement management system 220 detects wear in the implement 230 pulled by the vehicle 210 and modifies an operating mode of the vehicle 210 based on the likely wear detected. Specifically, the implement management system 220 can determine and compare current and expected orientation vectors, where the result of the comparison is used to modify the operating mode. For example, the implement management system 220 determines that the difference in angle of pull of the current and expected orientation vectors exceeds a threshold indicative of a missing shank within the pulled implement 230 and the system 220 pauses operation of the vehicle 210. The implement management system 220 determines a state of the implement pulled by the vehicle 210 and modifies an operating mode of the vehicle 210 based on the determined implement state. For example, the implement management system 220 determines shanks of a plow pulled by a tractor are ground-engaged, and prevents the tractor from moving in reverse while the shanks are ground-engaged.

The implement management system 220 includes various software modules configured to determine implement wear or states and modify the operating mode of the vehicle 210 based on the determination. The software modules include an operation control module 221, a model training engine 222, a user interface module 223, an orientation vector module 224, an orientation vector prediction model 225, an implement state module 226, a soil state model 227, an implement state model 228, and another implement state model 229. The implement management system 220 may have alternative configurations than shown in FIG. 2, including for example different, fewer, or additional components. For example, the implement management system 220 may not include the model training engine 222. In such an example, the training for machine learning models used by the implement management system 220 may be performed remotely rather than at the vehicle 210 to conserve processing or power resources of the vehicle 210 or a computing device executing the implement management system 220.

The operation control module 221 receives operational information from the sensors 213 and uses one or more of the orientation vector module 224 or the implement state module 226 to modify an operating mode of the vehicle 210. In some embodiments, to detect and estimate wear of the implement 230, the operation control module 221 receives operational information including a predefined routine of the vehicle 210 pulling the implement 230, vehicle worksite parameters, machinery state parameters, or machinery trajectory parameters. The operation control module 221 may provide the received operation information to the orientation vector module 224 to determine an expected orientation vector. For example, the operation control module 221 receives a vehicle worksite parameter of the intended route of the vehicle 210, GPS coordinates of the current location of the vehicle 210, and machinery trajectory parameters from angle sensors measuring the steering angle of the vehicle 210 and the implement 230. The operation control module 221 provides the received operational information to the orientation vector module 224 to determine an expected orientation vector. The operation control module 221 may receive current and expected orientation vectors from the orientation vector module 224, and determine how to modify the operating mode of the vehicle 210 based on a difference between the current and expected orientation vectors. For example, the difference exceeds a threshold angle of 45 degrees and the operation control module 221 determines to pause the operation of the vehicle 210.

Examples of operation mode modifications that the operation control module 221 may determine in response to comparing current and expected orientation vectors include continuing operations, modifying operations of the vehicle 210, or modifying operations of the implement 230. Modifying operations of the vehicle 210 includes pausing operations or adjusting the navigation (e.g., steering or speed) of the vehicle 210. The operation control module 221 can determine to perform any of the operation mode modifications responsive to comparing a difference between the expected and current orientation vectors to a threshold value or predetermined range. The threshold values and predetermined ranges included herein are purely for illustration and variation in the threshold values and predetermined ranges will be recognized within those skilled in the art as falling within the scope of this description. The operation control module 221 may pause the operations of the vehicle 210 as described previously. As another example, the operational control module 221 may compare the difference in the current and expected orientation vectors to a threshold magnitude of 300 lbs/ft (e.g., a minimal draft force to pull a plow without any missing shanks or sweeps) or a threshold magnitude of 4.4 horsepower/ft. The threshold values or predetermined values may vary depending on the speed at which the implement 230 is pulled through the soil or the type of soil (e.g., contributing to the resistance of the soil). For example, coarse soil may have less resistance than fine soil, requiring less force to pull the implement 230, and slower speeds may require more force to pull the implement 230. If the difference in the magnitude between the current and expected orientation vectors is equal to or less than the threshold magnitude, the operational control module 221 may determine a ground engaging element (i.e., shank or sweep) is missing from the plow and pause operations.

In an example of modifying the operations of the vehicle 210, the difference between the current and expected orientation vectors may be within a predetermined range of 5 to 20 degrees, and in response, the operation control module 221 determines an operating mode modification of slowing the speed at which the vehicle 210 travels. In an example of continuing operations, the operation control module 221 determines that the difference between the current and expected orientation vectors is within a predetermined range of 6.5-8 horsepower/ft and in response, the operation control module 221 determines to continue operating the vehicle 210 as the vehicle 210 is presently operated.

In some embodiments, to determine a state of the implement 230 and modify an operating mode of the vehicle 210 using the determined state, the operation control module 221 receives operational information accesses information representative of a state of soil and images captured by the vehicle 210 of the implement 230. The information representative of the state of the soil may be obtained via sensors 213. The operation control module 221 may provide the received operation information to the implement state module 226 to determine a state of the implement 230. For example, the operation control module 221 receives a vehicle worksite parameter of the soil's moisture level (e.g., plasticity index), images of the soil through which the implement 230 is pulled, and images of the implement 230 taken by the vehicle 220 (e.g., using a rear-facing camera of the sensors 213). The operation control module 221 provides the received information and images to the implement state module 226 to determine the state of the implement 230. The operation control module 221 may receive the determined implement state from the implement state module 226 and determine how to modify the operating mode of the vehicle 210 based on the determined implement state.

Examples of operation mode modifications that the operation control module 221 may determine in response to determining a state of the implement 230 include continuing operations, modifying operations of the vehicle 210, or modifying a state of the implement 230. The modification to the operating mode is dependent on a predefined routine of the vehicle 210, which can include a location, a current operation, or subsequent operation of the vehicle 210. For example, the implement state of a plow is determined to be ground-engaged and the subsequent operation of the vehicle is to reverse. To prevent damage to the plow, the operation control module 221 determines to pause the operation of the vehicle 210 or to modify the state of the implement 230 such that the plow is raised before the vehicle 210 reverses.

In some embodiments, the operation control module 221 uses the route of the predefined routine to determine when to check the implement state and whether the operation mode should be modified. For example, the route includes a known obstacle at a location in the route, where the implement state should be raised to avoid the obstacle. The operation control module 221 may access operational information and images collected by the sensors 213 and use the implement state module 226 to determine whether the implement 230 is raised. If it is not raised, the operation control module 221 provides instructions to the vehicle 210 (e.g., through the embedded controller 211) to raise the implement 230. Otherwise, the operation control module 221 does not provide such instructions and allows the vehicle 210 to continue operations. In some embodiments, the operation control module 221 authorizes the vehicle to perform a next vehicle maneuver (e.g., a tight turn in which the direction and magnitude of force applied to one or more lowered ground engaging elements is outside a threshold for normal or specified operation when moving straight or in a lesser turn) in response to determining that the state of the implement is currently in the proper state (e.g., raised) for the next maneuver.

The operation control module 221 can use operations of the predefined routine to determine when to check the implement state and whether the operation mode should be modified. For example, the predefined routine includes an 3-point turn or applying the implement 230 to a sharp corner, both operations involving operating the vehicle 210 in reverse. In an example with a sharp corner, the operator wants to till or plow a corner of a field (as opposed to a smooth turn that may not necessarily cover a sharp corner) and the vehicle 210 will round the corner and then maneuver in reverse to apply the implement 230 to the entire corner. The operation control module 221 may access the predefined routine and monitor the current location of the vehicle 210 (e.g., using a GPS receiver of the sensors 213) to determine when the vehicle 210 is approaching the corner. In response to approaching the corner (e.g., determining that the vehicle 210 is within a 20 meters of the corner), the operation control module 221 accesses operational information and images collected by the sensors 213 and uses the implement state module 226 to determine whether the implement 230 is ground-engaged. In response to rounding the corner and before reversing, the operation control module 221 provides instructions for the vehicle to raise the implement 230.

The model training engine 222 trains machine learning models used by the implement management system 220 to determine an expected orientation vector, a soil state, or an implement state. The model training engine 222 may access the database 250 for training data provided by an operator or previously collected and stored by the vehicle 210 inside the database 250. The training data can be collected from the sensors 213 or sensors of similar vehicles (e.g., other tractors performing similar operations). Alternatively or additionally, the training data can be provided by an operator via the display 212 or a user input from which the user interface module 223 may receive feedback to re-train models. Machine learning models of the implement management system 220 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, or any suitable supervised or unsupervised learning algorithm.

The implement management system 220 uses an orientation vector prediction model 225 to determine an expected orientation vector of the implement 230. The orientation vector prediction model 225 may be a machine learning model trained by the model training engine 222 using operational information labeled with an empirical orientation vector. In some embodiments, the model training engine 222 may use operational information including images of implements as captured by a rear-facing camera on a vehicle. The model training engine 222 may label these implement images as being in line or out of line with the heading of the vehicle to which they're coupled. The model training engine 222 may use these labeled images to train a machine learning model (e.g., orientation vector prediction model 225) to determine that whether the expected orientation vector has an angle that is zero (i.e., the implement's heading is the same as the vehicle's heading) or non-zero. In some embodiments, the model training engine 222 may create a training set from operational information, the training set including feature vectors of vehicle worksite parameters, machinery state parameters, or machinery trajectory parameters. Each feature vector may be labeled with an empirical orientation vector (i.e., the angle and magnitude of pull by an implement on a vehicle that occurred under the conditions characterized by the operational information). For example, empirical orientation vectors associated with the training sets may be of functioning or malfunctioning ground engaging elements of the implement, where the ground engaging elements may be shanks or sweeps. The empirical orientation vectors used for the training sets can additionally or alternatively be of functioning wheels of the implement 230 of malfunctioning wheels of the implement 230 (e.g., to detect wear in the wheels of the implement).

The model training engine 222 may apply weights to the dimensions of the feature vectors, where a parameter of the operational information may be a respective dimension of the feature vector. For example, the model training engine 222 may weigh soil moisture greater than the type of ground engaging element of the implement. In some embodiments, the model training engine 222 may dynamically adjust the weights of the feature vectors during operation according to operator feedback. For example, the operator may provide feedback indicating that the expected orientation vector was incorrect (e.g., the operator implements a manual override within 5 seconds after the implement management system 220 modifies an operating mode) and the model training engine 222 uses this feedback to decrease the value of the weights used in determining the incorrect expected orientation vector.

Likewise, the operator may provide feedback indicating that the expected orientation was correct (e.g., the operator allows the modification of the operating mode to proceed without manual override) and the model training engine 222 uses this feedback to increase the value of the weights used in determining the correct expected orientation vector. The model training engine 222 may then re-train the orientation vector prediction model 225 using the training sets with the updated weights. This way, model training engine 222 may train the orientation vector prediction model 225 in multiple stages and increase the accuracy with which the model correctly predicts the expected orientation vector.

The model training engine 222 can train implement state models 228 and 229 to determine a state of the implement 230. As further described in the descriptions of the implement state models 228 and 229, the implement management system 220 may use multiple implement state models for respective types of soil types. The model training engine 222 can train the soil state model 227 to determine a state of the soil through which the implement 230 is pulled. The soil state model 227 may be a machine learning model trained by the model training engine 222 using images of soil labeled with a soil type, soil moisture level, or soil compaction. For example, the model training engine 222 may create a training set including images of soil having a plasticity index between 20-30 and labeled with that range. The implement state models 228 and 229 may be machine learning models trained by the model training engine 222 using images of implements labeled with a state of the implement. For example, the model training engine 222 may create a training set including images of a plow with shanks raised (i.e., not in the ground) and labeled with the "raised" state.

In some embodiments, the model training engine 222 trains the machine learning models used by the implement management system 220 (e.g., the orientation vector prediction model 225, soil state model 227, or the implement state models 228 and 229) in multiple stages. The model training engine 222 may initially train a machine learning model using data captured across a generalized representation of environments, vehicles, or implements. Subsequently, the model training engine 222 may use data captured by the vehicle 210 to re-train the machine learning model according to an operator's specific environments, vehicles, or implements.

In an example of a first stage of training, the model training engine 222 may use a first set of vehicle worksite parameters, machinery state parameters, and machinery trajectory parameters collected across various farming environments, vehicles, or implements to train a machine learning model for determining an expected orientation vector. This first set may be labeled with the corresponding empirical orientation vectors measured (e.g., by an angle sensor or force sensors) at substantially the same time as the parameters were measured. The model training engine 222 may then train a machine learning model (e.g., the orientation vector prediction model 225) using the first set. In a corresponding example of the second stage of training, the model training engine 222 uses a second set of vehicle worksite parameters, machinery state parameters, and machinery trajectory parameters collected at the farming environment of the operator. This second set may be similarly labeled with the corresponding empirical orientation vectors measured by the operators' vehicles. The model training engine 222 may use the second set to re-train the orientation vector prediction model 225 initially trained using the first set. In this way, the model training engine 222 enables a model that may adapt to the environment in which it is used to determine an expected orientation vector more accurately.

In another example of a first stage of training, the model training engine 222 may use a first set of implement images collected across various farming environments, vehicles, or implements to train a machine learning model for determining an expected implement state. This first set may be labeled with the implement states such as raised or ground-engaged. The model training engine 222 may then train a machine learning model (e.g., the implement state model 228) using the first set. In a corresponding example of the second stage of training, the model training engine 222 uses a second set of implement images collected at the farming environment of the operator. This second set may be similarly labeled with the corresponding implement states. The model training engine 222 may use the second set to re-train the implement state model 228 initially trained using the first set. This is yet another way that the model training engine 222 trains a model that may adapt to the environment in which it is used to determine an expected orientation vector more accurately. This multistage training may similarly be applied to a machine learning model configured to determine a likely state of soil.

In addition or alternatively, the model training engine 222 may use user feedback to train the models in the second stage. For example, the user interface module 223 receives feedback provided by the operator of the vehicle 210 using the display 212 that a machine learning model correctly or incorrectly modified an operating mode, identified an implement state, or detected wear in an implement. In some embodiments, the first training set used to train that model may also be included in the second training set to further strengthen a relationship or association between data and identified objects during the second stage of training. For example, if the received feedback indicated that the machine learning model correctly identified the implement state, the first training set may be included within the second training set.

In some embodiments, the model training engine 222 uses metadata related to the feedback to re-train a machine learning model. For example, the model training engine 222 may determine the frequency at which a user provides a user input requesting manual override of modifications to operating modes caused by the implement management system 220, and use the determined frequency to re-train the machine learning model. The model training engine 222 may use a threshold feedback frequency to determine a likelihood that the detected implement wear or determined implement state is accurate. For example, if an operator requests manual override within five seconds of the implement management system 220 modifying the operating mode, detected implement wear or determined implement state is likely inaccurate and the model training engine 222 may adjust the training data such that data associated with the inaccurate edge detected is given less weight or is not used to re-train the machine learning models.

In one example of re-training a machine learning model for determining an expected orientation vector (e.g., the orientation vector prediction model 225), the implement management system 220 receives an indication that the operator has requested a manual override of the operating mode modification within a threshold time (e.g., ten seconds) after the implement management system has modified the operating mode. In response to the indication including the manual override, the model training engine 222 re-trains the orientation vector prediction model 225 by weakening an association between the expected orientation vector and the received operational information used to determine the expected orientation vector. For example, the model training engine 222 may decrease the weights of the types of information in the received operational information, the weights used for creating a feature vector to input into the model 225. Alternatively, the implement management system 220 determines that the operator has not responded to the modification of the operating mode within a threshold time (e.g., one minute). In response to the indication including the non-response, the model training engine 222 may re-train the orientation vector prediction model 225 by strengthening the association between the expected orientation vector and the received operational information (e.g., increasing the weights of the types of information in the received operational information).

Figure 4:
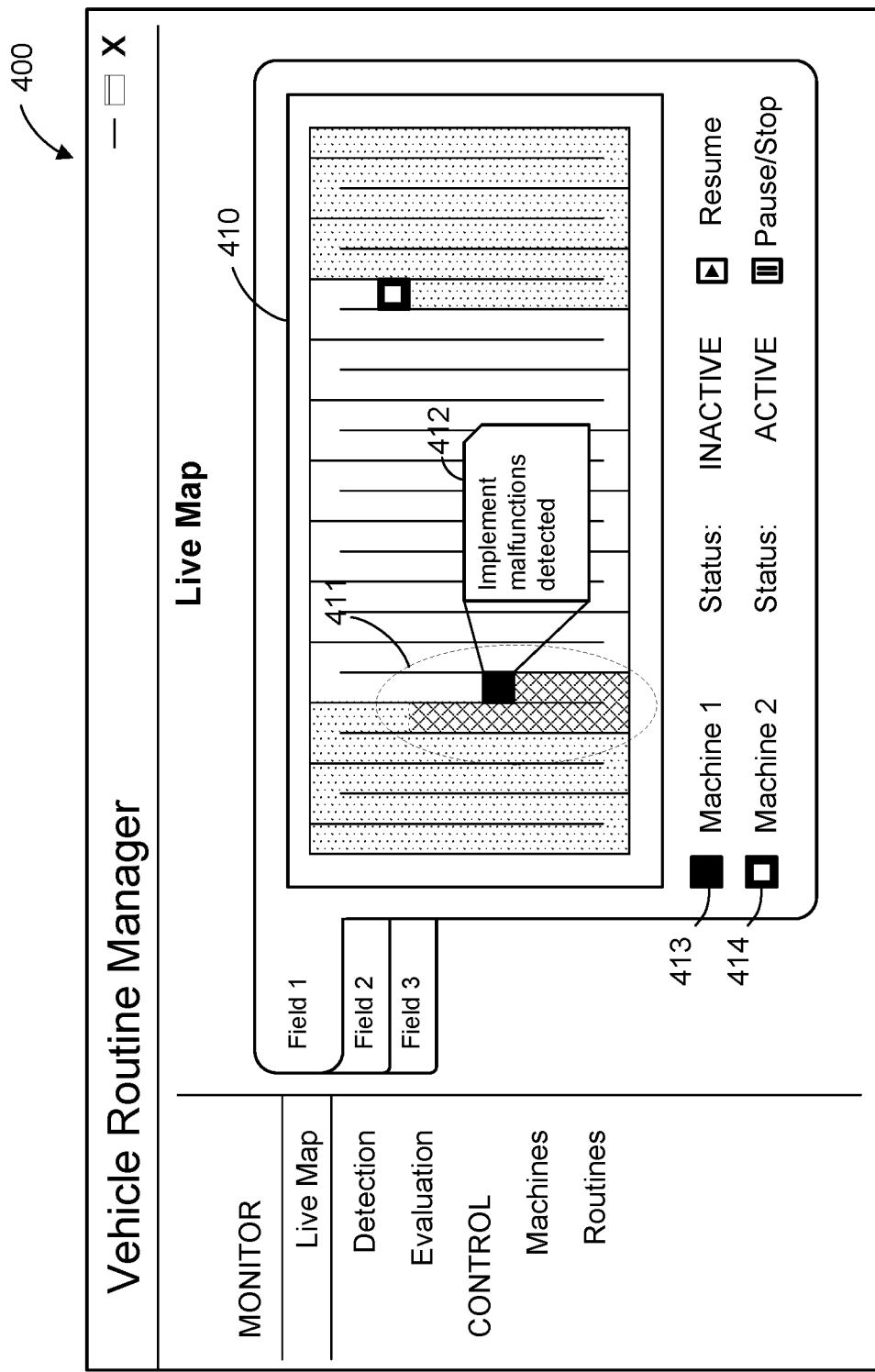
FIG. 4 depicts a graphical user interface (GUI) for detecting wear in implements during farming operations monitored by an implement management system, in accordance with at least one embodiment.

The user interface module 223 enables user input and system output for modifying the operation of the vehicle 210 using the implement management system 220. In some embodiments, the user interface module 223 provides a GUI for display at the display 212. An example of a GUI that the user interface module 223 can provide is depicted in FIG. 4. The user interface module 223 may provide notifications to an operator that an operating mode is to be modified based on the wear or state of the implement 230 pulled by the vehicle 210. In some embodiments, the user interface module 223 may provide the operating mode of the vehicle 210 at the display 212. For example, a GUI may display that the vehicle is currently engaged in automated steering in a reverse direction. The user interface module 223 may provide a notification including the status of the implement 230. For example, a notification may be provided alerting an operator that a ground engaging element has significant wear or has broken off such that the status has caused the implement management system 220 to modify the operating mode of the vehicle 210 to pause for the operator to address the potential problem with the ground engaging element.

The orientation vector module 224 determines current and expected orientation vectors. The orientation vector module 224 may access the sensors 213 to determine a current orientation vector. In a first example, the orientation vector module 224 uses measurements from an angle sensor to determine a towing angle of the implement 230, which may be used to determine the angle of pull of the current orientation vector. In a second example, the orientation vector module 224 uses a rear-facing camera to determine an offset exists between a heading value of the vehicle 210 and a heading value of the implement 230, which may be used to determine the angle of pull of the current orientation vector. In a third example, the orientation vector module 224 compares a GPS receiver's heading value of the vehicle 210 with a GPS receiver's heading value of the implement 230, which may be used to determine the angle of pull of the current orientation vector. The magnitude of pull of the current orientation vector may be measured using a force sensor (e.g., a strain gauge, load cell, force sensing resistor, etc.). The orientation vector module 224 may estimate the force needed to pull the implement using measurements of the engine power, engine torque, wheel torque, or other sensed tractor drivetrain parameters.

The orientation vector module 224 can apply the orientation prediction model 225 to determine an expected orientation vector. The orientation prediction model 225 may be a machine learning model trained by the model training engine 222. The machine learning model may be configured to determine one or more of the angle or magnitude of an expected orientation vector using operational information measured by the sensors 213. The orientation vector module 224 may access the operational information and create a feature vector from the accessed information to input into the orientation prediction model 225. For example, the orientation vector module 224 creates a feature vector using the topography of the current location of the vehicle 210 (as determined from the current location using a GPS receiver and the predefined routine's route), the speed of the vehicle 210, the number of ground engaging elements in the implement 230, and the dimensions of the vehicle 210 and implement 230. The orientation vector module 224 may input the feature vector into the orientation prediction model 225 that is trained using feature vectors of similar dimensions (i.e., the same parameters) and receive, as an output of the model, the expected orientation vector. In some embodiments, the orientation vector module 224 may also use images of the soil and the soil state model 227 to determine a likely state of the soil. This likely state of the soil may be used as a dimension of a feature vector to determine an expected orientation vector.

The orientation vector prediction model 225 may be a binary or fuzzy rules-based model or a mathematical formula that determines an expected orientation vector. For example, the orientation vector prediction model 225 includes rules that may be represented as a decision tree where each decision node may be a test on a parameter of the operational information, each branch of the test may represent a particular value or range of values of the parameter, and each end node may be a different expected orientation vector. Similarly, the formula may use a priori or sensed data values in determining an expected orientation vector. In some embodiments, the implement management system 220 includes multiple orientation vector prediction models and weights the output of multiple models to determine the expected orientation vector. For example, the orientation vector module 224 uses both a machine learning model and a rules-based model to determine the expected orientation vector, and may weigh the machine learning model's output higher than the rules-based model's output. Accordingly the orientation vector module 224 may determine a weighted output of the likely expected orientation vector.

The implement state module 226 determines a state of the implement 230. For example, the implement state module 226 may determine if a plow pulled by the vehicle 210 has shanks that are raised or ground-engaged. The implement state module 226 may have access to multiple implement state models to apply to operational information (e.g., images of implements). The implement state model 226 may select one of the implement state models based on a soil state or may select an implement state model as a default. To select an implement state model based on a soil state, the implement state model 226 may use the soil state model 227 or a statistical analysis of operational information (e.g., a likely soil state based on weather patterns) to determine the soil state.

In some embodiments, the implement state module 226 calculates the height of the implement 230 with respect to the surface of the soil. The implement state module 226 may access machinery state information from the sensors 213 (e.g., height sensors). The implement state module 226 determines the height of the implement 230 based on the accessed information based on the elevation of the soil and the elevation of the implement 230. The implement state module 226 determines the elevation of the soil based on information from a GPS receiver and a predefined route of the vehicle 210. The implement state module 226 determines the elevation of the implement 230 using an altimeter at the implement 230. The altimeter may use barometric pressure, time of flight (e.g., lidar, radar, sonar, GPS), image analysis, or any other suitable approach to measuring altitude. The implement state module 226 calculates a difference between the elevation of the soil and the elevation of the implement 230 to determine the height of the implement 230 with respect to the surface of the soil. In some embodiments, the implement state module 226 may use the determined height and the output of the selected implement state model to determine the state of the implement. For example, the determined height may fall within a range of heights indicative of a raised implement. However, the output of the selected implement state model may indicate that the state of the implement is ground engaged. The implement state module 226 may prioritize the determined height over the output of the model, and determine that the state of the implement is raised. Alternatively, the implement state module 226 may prioritize the output of the model and determine that the implement state is ground engaged. This prioritization may be based operator-specified (e.g., the operator provides weights for methods of determining the implement state).

The implement state module 226 may determine the state of the implement using a voting-based or unanimous decision method. The implement state module 226 may consider the output of the calculated height, an implement state model, or a statistical model that uses hydraulic, hitch, sensor, or perception information to determine a likely state of the implement. For a voting-based method, the implement state module 226 may determine that the state of the implement is the state that received the most "votes" of the considered outputs. For example, the implement state module 226 determines that the calculated height is indicative of a raised implement, the implement state model selected also determines that the implement is raised, and the statistical model based on sensor information (e.g., force or angle sensor measurements) determines that the implement is ground-engaged. Because two outputs determined that the implement is raised and one determined that the implement was lowered, the votes for "raised" exceeds the votes for "ground-engaged," and the implement state module 226 determines that the implement is raised. For a unanimous decision method, the implement state module 226 will determine a state of the implement when outputs it considers unanimously output the same state. The implement state module 226 may retry determining the state using current operational information until a state is unanimously determined.

The soil state model 227 uses operational information captured by the sensors 213 to output a likely state of soil. The state of a soil may include the soil's type, moisture level, or compaction. The operational information captured by the sensors 213 may include images of the soil captured by the vehicle 210 as it performs operations. The soil state model 227 may be trained by the model training engine 222 using images of soil labeled with the corresponding state.

The implement state models 228 and 229 uses operational information captured by the sensors 213 to output a likely state of the implement 230. The implement state models 228 and 229 may be machine learning models. The operational information may include images of the implement 230 (e.g., as taken from a rear-facing camera of the vehicle 210). The implement state model 228 or 229 may be a machine learning model trained based on images of respective soil states and be selected by the implement state module 226 based on a soil state identified by the operational information. For example, the soil state model 227 determines that the soil state is of a type having crops and a plasticity index within the range of 40-50, and selects an implement state model trained on images of implements operating within soil of the determined state. In this way, each machine-learned implement state model trained and applied by the implement management system 220 may be output a likely implement state more accurately. Although only two implement state models are shown, more or less (e.g., one) implement state model may be used by the implement management system 220. For example, there may be an implement state model for each soil state that an operator provides labeled training data for the model training engine 222 to train.

In some embodiments, the implement state module 226 uses the soil state model 227 to select an implement state model from multiple models (e.g., the implement state models 228 and 229). The soil state model 227 outputs a likely soil state (e.g., soil type, soil moisture level, or soil compaction), which may be used to select an implement state model that is trained (e.g., by the model training engine 222) on images of implements in soil characterized by that soil state. In some embodiments, the implement state module 226 uses an implement state model without using the soil state model 227. For example, the implement management system 220 receives operational information indicative that the weather for the current day and previous week have been sunny and dry. The implement state module 226 may bypass the execution of the soil state model 227 to determine a likely state of the soil. Instead, the implement state module 226 may select an implement state model for dry soil using the received weather information. Although weather information is used as an example, the implement state module 226 may use any suitable operational information to deduce a likely state of soil without using the soil state model 227. By using an implement state model without the soil state model 227, the implement management system 220 may conserve processing and power resources of the computing device executing the system.

The remote server 240 may store and execute the implement management system 220 for remote use by the vehicle 210. For example, the vehicle 210 may provide operational information to the remote server 240 over the network 260, and the remote server 240 may execute the implement management system 220 hosted on the remoted server. The remote server 240 may then provide instructions for modifying an operation mode of the vehicle 210 via the network 260 to the vehicle 210. The remote server 240 may work with a processor on the vehicle 210 to execute functions of the implement management system 220. For example, the remote server 240 may train machine learning models using the model training engine for access over the network 260.

The database 250 is a storage for data collected by the vehicle 210 (e.g., using the sensors 213) or provided by an operator. Data collected by the vehicle 210 may include images or videos of the environment through which the vehicle 210 travels. For example, images depicting the soil through which the implement 230 is pulled or images of the implement 230 may be stored in the database 250. Data provided by the operator may include training images or training videos for the model training engine 222 to access and train machine learning models of the implement management system 220. The training data may be labeled by the operator when provided to the database 250 or the training data may be labeled by the model training engine 222 using computer vision. Data provided by the operator may include user input and/or feedback provided during the operation of the vehicle 210. For example, the operator may provide user input overriding a change in operating mode determined by the operation control module 221. This input and metadata about the input (e.g., the time difference between the change in operating mode and the operator's manual override) may be stored at the database 250.

The network 260 may serve to communicatively couple the vehicle 210, the remote server 240, and the database 250. In some embodiments, the network 260 includes any combination of local area and/or wide area networks, using wired and/or wireless communication systems. The network 260 may use standard communications technologies and/or protocols. For example, the network 260 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 260 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML), extensible markup language (XML), JavaScript Object Notation (JSON), or Protocol Buffers (Protobuf). In some embodiments, all or some of the communication links of the network 260 may be encrypted using any suitable technique or techniques.

Figure 3:
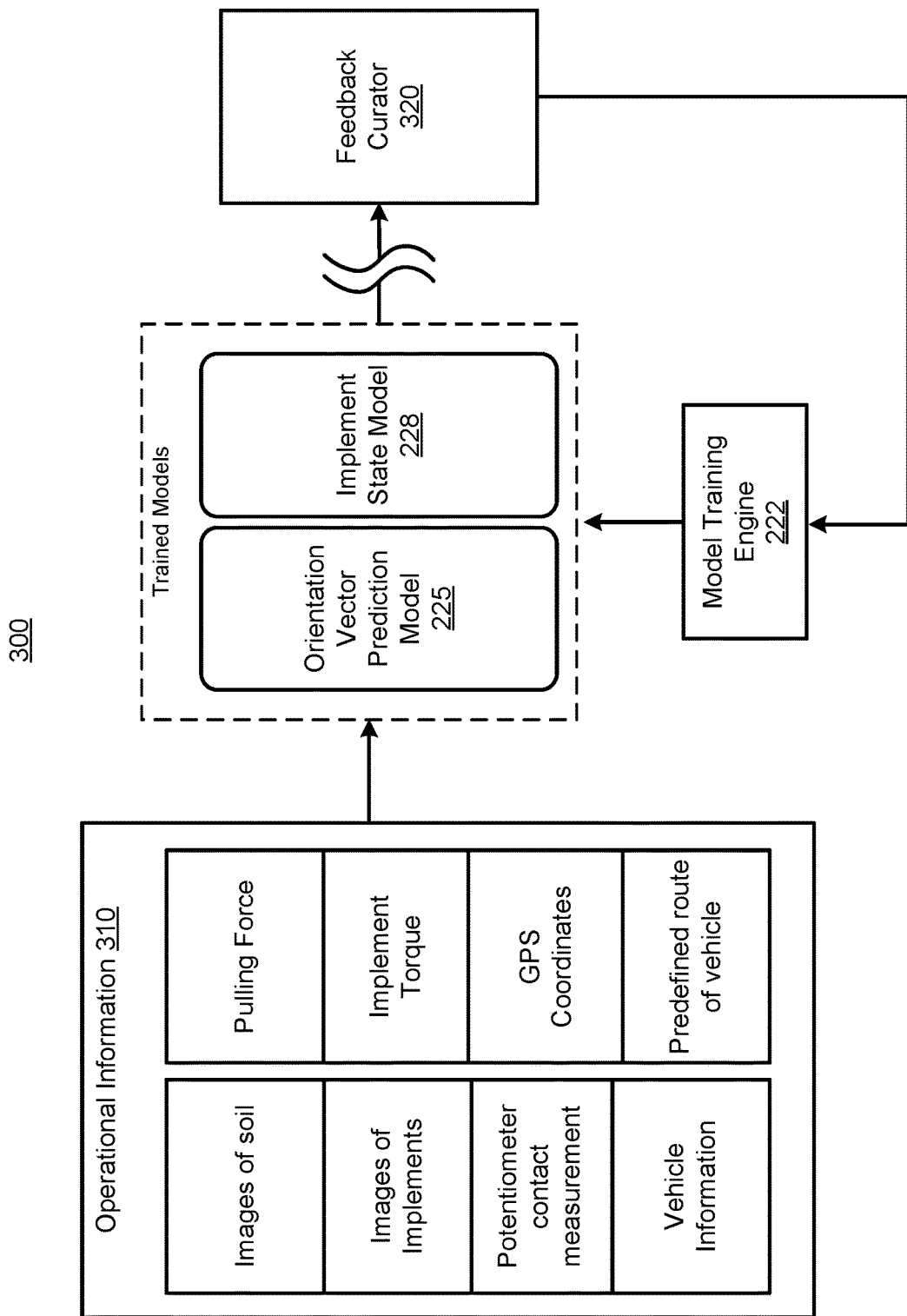
FIG. 3 depicts a block diagram of a process for re-training machine learning models of an implement management system, in accordance with at least one embodiment.

FIG. 3 depicts a block diagram of a process 300 for re-training machine learning models of an implement management system, in accordance with at least one embodiment. The process 300 begins by inputting operational information 310 into a trained model such as the implement state model 228 or the orientation vector prediction model 225 of FIG. 2. The implement management system 220 performs the process 300. Although not depicted, the output of the trained models is used by the implement management system 220 to modify the operating mode of a vehicle performing an operation. An operator may provide feedback regarding the success of the modification, which is received by the implement management system 220 (e.g., at the display 212) and processed by the feedback curator 320. The feedback curator 320 may preprocess (e.g., filter) the feedback before providing the feedback to model training engine 222, which re-trains the trained models using the feedback. The process 300 may have alternative configurations than shown in FIG. 3, including different, fewer, or additional components. For example, although the feedback curator 320 is shown as outputting feedback to the model training engine 222, the model training engine 222 may perform the functions of the feedback curator 320, receiving and processing feedback provided by the operator without the feedback curator 320.

The operational information 310 includes images of the soil and implements, a measurement of relative position among components of the implement from a potentiometer, vehicle information, a force with which an implement pulls on a vehicle, a torque from the implement on the vehicle, GPS coordinates, a predefined route of the vehicle, soil information derived from measured electromagnetic fields, capacitive sensors, thermal sensors, any suitable soil moisture sensor, or a combination thereof. The operational information 310 include example types of operational information, and those of skill in the art will appreciate that different, additional, or fewer types of operational information may be used as described in FIGS. 1 and 2. The operational information 310 can be measured from the sensors 213, the sensors 231, or obtained from an operator before the start of operation. For example, an operator may provide the predefined route of the vehicle at the database 250 for access by the vehicle through its operations.

The implement management system 220 may apply one or more information types of the operational information 310 to a trained model. In a first example, the operation control module 221 receives images of the implements, GPS coordinates, and the predefined route of a vehicle and provides the information to the orientation vector module 224. The orientation vector module 224 applies the orientation vector prediction model 225 to the received information, the orientation vector prediction model 225 initially trained by the model training engine 222 on images of the implements, GPS coordinates, and the predefined route of the vehicle and corresponding labels of empirical orientation vector angles or magnitudes. In a second example, the operation control module 221 receives images of implements of the operational information 310 and provides the images to the implement state module 226. The implement state module 226 applies the implement state model 228 to the received information, the implement state model 228 initially trained by the model training engine 222 on images of implements labeled with the states of the respective images.

The implement management system 220 uses the output of the trained models to modify an operating mode of a vehicle. In the first example, the orientation vector prediction model 225 outputs an expected orientation vector. The orientation vector module 224 may determine a current orientation vector using information collected by the sensors 213 or 231. The expected and current orientation vectors are used by the operation control module 221 to determine whether and how to modify an operating mode of the vehicle (e.g., pause operations). In the second example, the implement state model 228 outputs a determined implement state. The implement state module 226 may determine whether and how to modify an operating mode of the vehicle using the determined state. After modifying the operating mode of the vehicle, the implement management system 220 may receive operator feedback (e.g., via the user interface module 223) that is processed at the feedback curator 320. The feedback curator 320 provides the processed feedback to the model training engine 222 to retrain the orientation vector prediction model 225 or the implement state model 228.

The feedback curator 320 may process feedback received from an operator. In some embodiments, the feedback curator 320 filters the feedback, providing a subset to the model training engine 222. For example, the feedback curator 320 selects positive feedback such as user confirmation that a worn out implement or an implement state was properly detected to encourage positive reinforcement of the machine learning models during re-training. In some embodiments, the feedback curator 320 uses a location condition to limit the amount of feedback to assemble. For example, the feedback curator 320 can filter feedback received over an operator-specified area, the feedback annotated with identifiable information such as GPS coordinates or time at which it was taken. The feedback curator 320 may further filter the feedback based on an implement or vehicle. For example, the feedback curator 320 selects feedback taken by an operator-specified implement or vehicle for the model-training engine 222 to re-train machine learning models.

User Interface for Monitoring Implements

FIG. 4 depicts a graphical user interface (GUI) 400 for detecting wear in implements during farming operations monitored by an implement management system, in accordance with at least one embodiment. The GUI 400 may be displayed on a display collocated with a vehicle performing farming operations with the implement management system or on a display remotely located from the vehicle. For example, the implement management system 220 provides the GUI 400 on the display 212 using the user interface module 223. The GUI 400 includes a live map 410 of the environment in which vehicles perform farming operations, a graphically distinguished portion 411 of a predefined route in which a vehicle travels, a notification 412 of a malfunction detected with the implement of the vehicle, and vehicle icons 413 and 414 representative of the vehicles' locations within the live map 410. The GUI 400 may have alternative configurations than shown in FIG. 4, including for example different, fewer, or additional user interface elements.

The implement management system 220 may detect likely wear with an implement during operation and without modifying the operation of the vehicle 413, record the locations at which the vehicle 413 has traveled with the worn implement. For example, the comparison of the current and expected orientation vectors may result in a difference that falls within a predetermined range representative of minor wear that does not necessarily trigger a pause in operations because the wear is not critical. The implement management system 220 can note the GPS coordinates of the vehicle 413's travels while this wear is detected instead of pausing operations. These GPS coordinates can be used by the user interface module 223 to display the graphically distinguished portion 411 on the live map 410. Further, the implement management system 220 can provide the notification 412 that the wear in the implement was detected.

An operator may interact with the GUI 400 to request that the implement management system 220 stop the operation of the vehicle 413. For example, an operator that is collocated with the vehicle 413 may manually inspect the implement being pulled, notice that the wear is not minor and is rather critical. The operator may provide user input at the GUI 400 displayed at the display 212 to manually override the implement management system 220's decision to continue operations. This feedback may be used by the model training engine 222 to retrain a machine learning model (e.g., the orientation vector prediction model 225).

Processes for Monitoring Implements Using an Implement Management System

Figure 5:
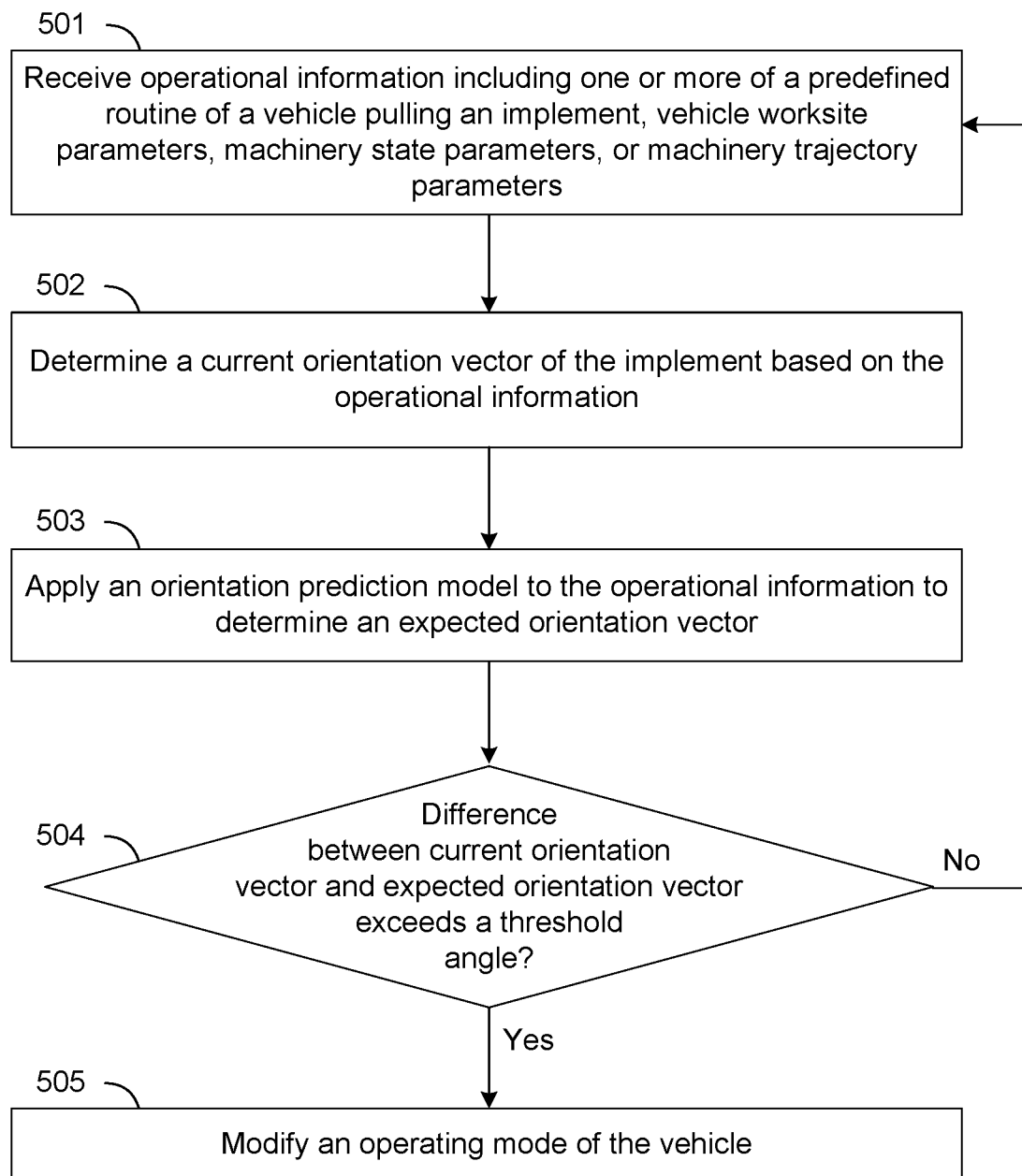
FIG. 5 is a flowchart illustrating a process for modifying an operating mode of a vehicle based on an expected orientation vector, in accordance with at least one embodiment.

FIG. 5 is a flowchart illustrating a process 500 for modifying an operating mode of a vehicle based on an expected orientation vector, in accordance with at least one embodiment. In some embodiments, the implement management system 220 performs operations of the process 500 in parallel or in different orders, or may perform different steps. For example, the process 500 may determine 502 a current orientation vector in parallel to applying 503 an orientation prediction model to determine an expected orientation vector.

The implement management system 220 receives 501 operational information including one or more of a predefined routine of a vehicle pulling an implement, vehicle worksite parameters, machinery state parameters, or machinery trajectory parameters. The operational information may be received from sensors at the vehicle, sensors at the implement, or provided to the implement management system 220 from an operator (e.g., stored at the database 250 by the operator of the vehicle). For example, the system accesses the predefined routine of the vehicle and the topography of the predefined routine from the database 250, the speed of the implement from a sensor (e.g., wheel odometer, GPS receiver, or radar) at the implement, and the towing angle of the implement from a sensor (e.g., angle sensor) at the implement. The operation control module 221 may receive 501 the operational information.

The implement management system 220 determines 502 a current orientation vector of the implement using one or more sensors coupled to the vehicle, the current orientation vector indicative of a current angle of pull of the implement on the vehicle. For example, the orientation vector module 224 accesses angle and force sensors at the vehicle (e.g., at the hitch connecting the implement to the vehicle) to determine the current orientation vector. The angle and force may be measured at one location or at multiple locations depending on the style of connection between the tractor and implement (e.g., tongue hitch, 3-point hitch, clevis hitch, loader hitch, etc.). In some embodiments, the orientation vector module 224 accesses sensors at the implement to determine the current orientation vector. Alternatively or additionally to indicating the current angle of pull of the implement on the vehicle, the current orientation vector may be indicative of a magnitude of pull of the implement on the vehicle.

The implement management system 220 applies 503 an orientation prediction model to the operational information to determine an expected orientation vector of the implement indicative of an expected angle of pull of the implement on the vehicle. The orientation prediction model may be a machine learning model trained using the model training engine 222 using operational information labeled with empirical orientation vectors. The empirical orientation vectors may measure the pull of malfunctioning or functioning implements on the vehicle. The orientation prediction model may be a statistical model that determines a likely expected orientation vector based on historical records of empirical orientation vectors and operational information. Alternatively or additionally, the implement management system 220 may use one or more algorithms to calculate an expected orientation vector (e.g., using the principles of mechanics and physics).

The implement management system 220 determines 504 whether a difference between the current orientation vector and the expected orientation vector exceeds a threshold angle. For example, the orientation vector module 224 may determine a difference in the current orientation vector's angle of pull of the implement on the vehicle and the expected orientation vector's angle of pull of the implement on the vehicle. Alternatively or additionally, the orientation vector module 224 may determine a difference in the current orientation vector's magnitude of pull of the implement on the vehicle and the expected orientation vector's magnitude of pull on the implement on the vehicle.

The implement management system 220 modifies 505 an operating mode of the vehicle in response to a difference between the current orientation vector and the expected orientation vector exceeding a threshold angle. For example, the orientation vector module 224 pauses operation in response to the difference exceeding a threshold angle of 45 degrees. In some embodiments, the orientation vector module 224 may also consider a period of time during which the difference exceeds the threshold angle before modifying 505 the operating mode of the vehicle. For example, the orientation vector module 224 determines whether the threshold angle of 45 degrees has been exceeded by an average of measurements taken within a period of five minutes before determining to pause the operations of the vehicle. In some embodiments, the orientation vector module 224 determines whether the difference has exceeding a threshold angle for a threshold number of consecutive instances. For example, the orientation vector module 224 determines to pause the operations of the vehicle in response to determining that the difference has exceeded a threshold angle for at least five consecutive determinations of the difference.

Figure 6:
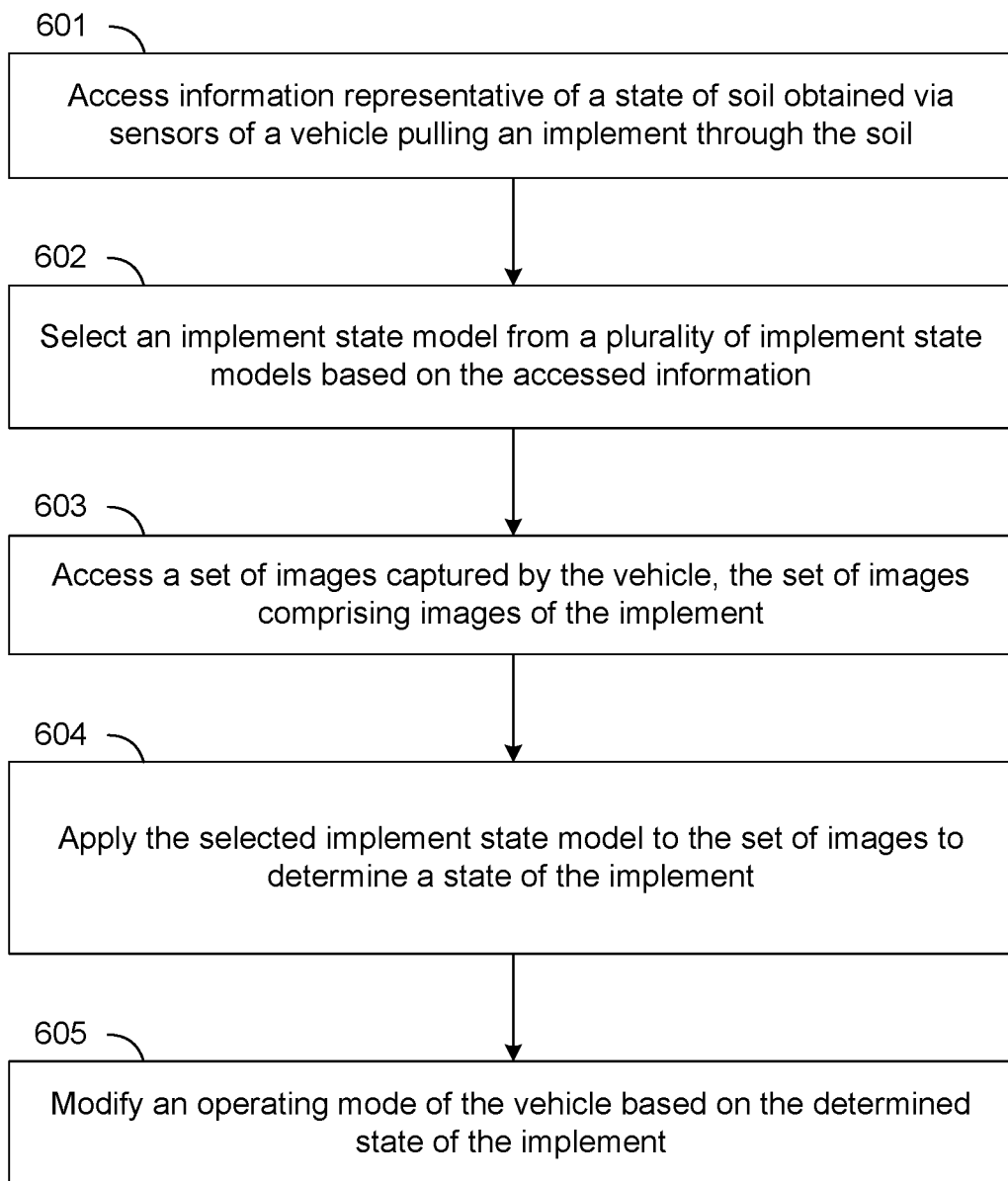
FIG. 6 is a flowchart illustrating a process for modifying an operating mode of a vehicle based on a determined state of an implement, in accordance with at least one embodiment.

FIG. 6 is a flowchart illustrating a process 600 for modifying an operating mode of a vehicle based on a determined state of an implement, in accordance with at least one embodiment. In some embodiments, the implement management system 220 performs operations of the process 600 in parallel or in different orders, or may perform different steps. For example, the process 600 may access 603 a set of images including images of the implement in parallel to accessing 601 information representative of a state of soil.

The implement management system 220 accesses 601 information representative of a state of soil obtained via sensors of a vehicle pulling an implement through the soil. For example, a camera of the vehicle may capture images of the soil, which may depict muddy soil that represents a particular moisture level of the soil. In some embodiments, the operation control module 221 may access 601 information regarding the moisture level and compaction of the soil through which the vehicle is pulling an implement. The sensors of the vehicle may include one or more probes for measuring the moisture level and compaction of the soil on-the-go (e.g., measurements taken periodically, such as every minute, that the vehicle travels) or at specific locations (e.g., along a predefined route of the vehicle). For example, the vehicle may periodically pause movement to use the probes to measure the information representative of the state of soil. Alternatively or additionally, the implement management system 220 may access 601 the information representation of a state of soil from the database 250, the information stored in the database measured and provided by an operator prior to the operation of the vehicle.

The implement management system 220 selects 602 an implement state model from implement state models based on the accessed information, each of implement state models configured to determine a state of the implement based on images of the implement. For example, the implement state module 226 may use the accessed 601 images input to the soil state model 227, which may be a machine learning model, to determine a likely state of the soil. Based on the likely state of the soil, the implement state module 226 selects 602 an implement state model that has been trained on training sets associated with the corresponding soil state. If the information accessed 601 is taken from a sensor that directly outputs the state of the soil (e.g., soil moisture probes), the implement management system 220 may select 602 an implement state model without using the soil state model 227. In some embodiments, the implement management system 220 selects 602 an implement state model, where the selected implement state model is the single, available model (i.e., there are no additional implement state models from which the implement management system 220 may select 602).

The implement management system 220 accesses 603 a set of images captured by the vehicle, the set of images including images of the implement. For example, the operation control module 221 access images taken from a camera of the sensors 213 facing the implement of the vehicle. The images may depict the type of implement (e.g., a plow), the number of ground engaging elements of the implement (e.g., the number of shanks or sweeps of the plow), the state of the ground engaging elements (e.g., raised or ground-engaged).

The implement management system 220 applies 604 the selected implement state model to the set of images to determine the state of the implement. For example, the implement state module 226 may select the implement state model 228 for a particular soil state of the captured images of the soil and apply the implement state model 228 to the images of the implements. The implement state model 228 may be trained using images of implements operating in the particular soil state. For example, the training images depicted a plow engaged or raised in soil of the particular soil state. The implement state module 226 receives, as an output from the implement state model 228, a determined state of the implement. For example, the implement state model 228 determines that the plow is presently ground-engaged.

In some embodiments, different implement state models may output different implement states for the same input image(s). For example, a model trained for dry ground conditions may emphasize the relative positions of implement elements in raised and lowered states whereas a model trained for extremely muddy conditions may emphasize the relative positions of implement elements and the ground surface. In one example, a vehicle sunken in muddy conditions may have moved the implement to a raised position but the ground engaging elements are still in contact with the mud. A model trained for dry ground conditions may output "raised" while a model trained for extremely muddy conditions may output "ground engaged."

The implement management system 220 modifies 605 an operating mode of the vehicle based on the determined state of the implement. For example, the implement management system 220 may modify the operating mode of the vehicle by raising the implement from the ground if the determined implement state is ground-engaged and the vehicle's subsequent instructions in the predefined routine is to move in reverse.

Additional Considerations

Some portions of the preceding detailed descriptions have been presented in terms of algorithms and symbolic representations of operations on data bits within a computer memory. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. The software modules described herein may be embodied as program code (e.g., software comprised of instructions stored on non-transitory computer readable storage medium and executable by at least one processor) and/or hardware (e.g., application specific integrated circuit (ASIC) chips or field programmable gate arrays (FPGA) with firmware). The modules correspond to at least having the functionality described herein when executed/operated.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

A processing device as described herein may include one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. The processing device may be configured to execute instructions for performing the operations and steps described herein. A controller or microcontroller as described herein may include one or more processors, such as a central processing unit, internal memory, and input/output components. The controller may communicatively couple processing devices such that one processing device may manage the operation of another processing device through the controller. A controller may be communicatively coupled to a processing device through a CAN bus.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for monitoring implements during automated operations through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   accessing information representative of a state of soil obtained via sensors of a vehicle pulling an implement through the soil;
   selecting an implement state model indicating a ground engagement state of the implement from among a plurality of implement state models based on the accessed information, the plurality of implement state models respectively corresponding to various states of soil;
   accessing a set of images captured by the vehicle, the set of images comprising images of the implement;
   applying the selected implement state model to the set of images to determine the state of the implement; and
   modifying an operating mode of the vehicle based on the determined state of the implement.

2. The method of claim 1, wherein the implement comprises one or more of a shank, sweep, disk, blade, wheel, tine, or knife.

3. The method of claim 1, wherein the state of soil comprises one or more of a soil type, a soil moisture measurement, or a soil compaction measurement.

4. The method of claim 1, wherein the state of the implement is raised or ground-engaged.

5. The method of claim 1, further comprising:
   accessing implement state information obtained via height sensors of the vehicle;
   determining a height of the implement based on the accessed implement state information; and
   determining the state of the implement based on the determined height and an output of the selected implement state model.

6. The method of claim 5, wherein the height sensors include one or more of potentiometers, altimeter, angle sensors, GPS, radar, or sonar.

7. The method of claim 5, wherein determining the height of the implement comprises:
   determining an expected elevation based on GPS and a predefined route of vehicle;
   determining an empirical elevation of the implement using an altimeter; and
   calculating a difference between the expected elevation and the empirical elevation to determine the height.

8. The method of claim 1, further comprising determining the state of the implement using a collective decision based on the applied implement state model and one or more of hydraulic information, hitch information, sensor information, or perception information.

9. The method of claim 8, wherein the collective decision is vote-based, the determined state of the implement receiving most votes.

10. The method of claim 1, further comprising:
    determining a location of the vehicle within a predefined route of the vehicle; and
    in response to the determined location matching a predetermined location for checking the implement state, determining the state of the implement.

11. The method of claim 1, wherein modifying the operating mode of the vehicle comprises, in response to a next vehicle maneuver requiring the state of the implement to be raised and the determined state of the implement is ground-engaged, pausing operation of the vehicle.

12. The method of claim 1, wherein modifying the operating mode comprises, in response to a next vehicle maneuver requiring the state of the implement to be raised and the determined state of the implement is raised, authorizing the vehicle to perform the next vehicle maneuver.

13. The method of claim 12, wherein the next vehicle maneuver is a tight turn.

14. The method of claim 1, wherein modifying the operating mode comprises, in response to the operating mode requiring the state of the implement to be ground-engaged and the determined state of the implement is raised, instructing the vehicle to engage the implement with the soil.

15. The method of claim 1, wherein the accessed information comprises images of the soil and wherein selecting the implement state model comprises:
    applying a machine learning model to the images of the soil to determine a plasticity level of the soil based on images of the soil; and
    selecting the implement state model based on the determined plasticity level of the soil.

16. The method of claim 15, further comprising training the machine learning model on training images of soil, each training image labeled with an empirical plasticity level of the soil.

17. The method of claim 1, wherein the sensor information comprises a torque measurement of the vehicle, wherein a plurality of torque measurements correspond to various states of soil.

18. A system comprising a hardware processor and a non-transitory computer-readable storage medium storing executable instructions that, when executed by the processor, are configured to cause the system to perform steps comprising:
    accessing information representative of a state of soil obtained via sensors of a vehicle pulling an implement through the soil;
    selecting an implement state model indicating a ground engagement state of the implement from among a plurality of implement state models based on the accessed information, the plurality of implement state models respectively corresponding to various states of soil;
    accessing a set of images captured by the vehicle, the set of images comprising images of the implement;
    applying the selected implement state model to the set of images to determine the state of the implement; and
    modifying an operating mode of the vehicle based on the determined state of the implement.

19. A non-transitory computer readable storage medium storing executable instructions that, when executed by one or more processors, cause the one or more processors to perform steps comprising:
    accessing information representative of a state of soil obtained via sensors of a vehicle pulling an implement through the soil;
    selecting an implement state model indicating a ground engagement state of the implement from among a plurality of implement state models based on the accessed information, the plurality of implement state models respectively corresponding to various states of soil;

accessing a set of images captured by the vehicle, the set of images comprising images of the implement;

applying the selected implement state model to the set of images to determine the state of the implement; and modifying an operating mode of the vehicle based on the determined state of the implement.

* * * * *